(12) United States Patent
Toy

(10) Patent No.: US 10,142,246 B2
(45) Date of Patent: Nov. 27, 2018

(54) SYSTEMS AND METHODS FOR MANAGING A NETWORK

(71) Applicant: Comcast Cable Communications, LLC, Philadelphia, PA (US)

(72) Inventor: Mehmet Toy, Allendale, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 69 days.

(21) Appl. No.: 14/929,940

(22) Filed: Nov. 2, 2015

(65) Prior Publication Data

US 2016/0142328 A1   May 19, 2016

Related U.S. Application Data

(63) Continuation of application No. 13/669,742, filed on Nov. 6, 2012, now Pat. No. 9,215,181.

(51) Int. Cl.
*H04L 12/825* (2013.01)
*H04L 12/801* (2013.01)
*H04L 12/26* (2006.01)

(52) U.S. Cl.
CPC .......... *H04L 47/25* (2013.01); *H04L 43/0882* (2013.01); *H04L 47/26* (2013.01); *H04L 47/35* (2013.01)

(58) Field of Classification Search
CPC ......... H04L 47/25; H04L 47/35; H04L 47/26; H04L 43/0882
See application file for complete search history.

(56) References Cited

U.S. PATENT DOCUMENTS

| | | | |
|---|---|---|---|
| 5,313,454 A | 5/1994 | Bustini et al. | |
| 5,787,072 A | 7/1998 | Shimojo et al. | |
| 6,122,254 A | 9/2000 | Aydemir et al. | |
| 6,577,642 B1 | 6/2003 | Fijolek et al. | |
| 7,782,906 B2 | 8/2010 | Zhai | |
| 7,961,621 B2 * | 6/2011 | Bergamasco | H04L 47/10 370/236 |
| 8,279,875 B2 | 10/2012 | Zhu et al. | |
| 8,660,075 B2 | 2/2014 | Ghanwani et al. | |

(Continued)

FOREIGN PATENT DOCUMENTS

| | | |
|---|---|---|
| CA | 2869841 | 10/2014 |
| EP | 2869516 | 5/2015 |

OTHER PUBLICATIONS

Chakchai et al., Enhanced Forward Explicit Congestion Notification (E-FECN) Scheme for Datacenter Ethernet Networks, 2008 International Symposium on Performance Evaluation of Computer and Telecommunication Systems (IEEE SPECTS 2008), Jun. 16-18, 2008, pp. 542-546.*

(Continued)

*Primary Examiner* — Shailendra Kumar
(74) *Attorney, Agent, or Firm* — Ballard Spahr LLP

(57) ABSTRACT

Systems and methods for managing congestion in a network are disclosed. One method can comprise receiving a service tag at a first node, the service tag representing congestion information of at least a portion of the network. If the first node is a boundary node, the method comprises modifying a downstream data rate based upon the congestion information, and if the first node is not a boundary node, the method comprises transmitting the congestion information to a second node.

36 Claims, 8 Drawing Sheets

(56) References Cited

U.S. PATENT DOCUMENTS

| | | |
|---|---|---|
| 9,088,510 B2 | 7/2015 | Li et al. |
| 2002/0023168 A1 | 2/2002 | Bass et al. |
| 2004/0174815 A1 | 9/2004 | Khisti et al. |
| 2005/0108444 A1* | 5/2005 | Flauaus ............... H04L 41/0853 710/15 |
| 2005/0157653 A1 | 7/2005 | Zeitak et al. |
| 2005/0169279 A1 | 8/2005 | Magd et al. |
| 2005/0220143 A1* | 10/2005 | DelRegno ............. H04M 7/006 370/471 |
| 2006/0030345 A1 | 2/2006 | Jain et al. |
| 2006/0126509 A1 | 6/2006 | Abi-Nassif et al. |
| 2006/0176824 A1 | 8/2006 | Laver et al. |
| 2006/0203730 A1 | 9/2006 | Zur |
| 2006/0250953 A1* | 11/2006 | Mooney ................. H04L 47/10 370/229 |
| 2007/0002848 A1 | 1/2007 | Kudou et al. |
| 2007/0147249 A1 | 6/2007 | Kumar |
| 2007/0153695 A1 | 7/2007 | Gholmieh et al. |
| 2007/0213038 A1 | 9/2007 | Masseroni et al. |
| 2007/0237078 A1 | 10/2007 | Hundscheidt et al. |
| 2008/0198746 A1 | 8/2008 | Kwan et al. |
| 2009/0318164 A1 | 12/2009 | Kee |
| 2010/0034115 A1 | 2/2010 | Busch |
| 2010/0172453 A1 | 7/2010 | Cankaya et al. |
| 2011/0051723 A1* | 3/2011 | Rabie ................. H04L 12/4641 370/389 |
| 2011/0216648 A1 | 9/2011 | Mehrotra et al. |
| 2012/0327779 A1 | 12/2012 | Gell et al. |
| 2013/0044598 A1 | 2/2013 | Zhang et al. |
| 2013/0128735 A1 | 5/2013 | Li et al. |
| 2013/0185454 A1 | 7/2013 | Guillemin et al. |
| 2014/0126368 A1 | 5/2014 | Toy |
| 2014/0269303 A1 | 9/2014 | Toy |
| 2014/0334334 A1 | 11/2014 | Brzozowski et al. |
| 2015/0117195 A1 | 4/2015 | Toy |
| 2015/0295801 A1 | 10/2015 | Vega et al. |

OTHER PUBLICATIONS

IEEE Computer Society, IEEE Standard for Local and metropolitan area networks—Virtual Bridged Local Area Networks, Amendment 13: Congestion Notification, Apr. 23, 2010, IEEE 802.1QauTM.*

European Search Report dated Mar. 26, 2015 by the European Patent Office for Application No. 14191129.7 which was filed on Oct. 30, 2014 and published on 2869516 on May 6, 2015 (Inventor-Mehmet Toy; Applicant—Comcast Cable Communications, LLC) (6 pages).

IEEE 802.1 QauTM—2010 IEEE Standard for Local and Metropolitan area network—Virtual Local Area Netvvorks, Amendment 13: Congestion Notification, Apr. 23, 2010, IEEE Computer Society, LAN/MAN Standards Committee (135 pages).

Ramakrishnan et al., IETF RFC 3168—The Addition of Explicit Congestion Notification (ECN) to IP, Sep. 2001 (63 pages).

Tufail, Muddassir, Timer Imposed and Priority Supported (TIPS) Congestion Control Scheme for Point-to-Multipoint Connections in ATM, DNAC (1996) (14 pages).

U.S. Appl. No. 13/669,742 (U.S. Pat. No. 9,215,181), filed Nov. 6, 2012 (Dec. 15, 2015), Mehmet Toy.

* cited by examiner

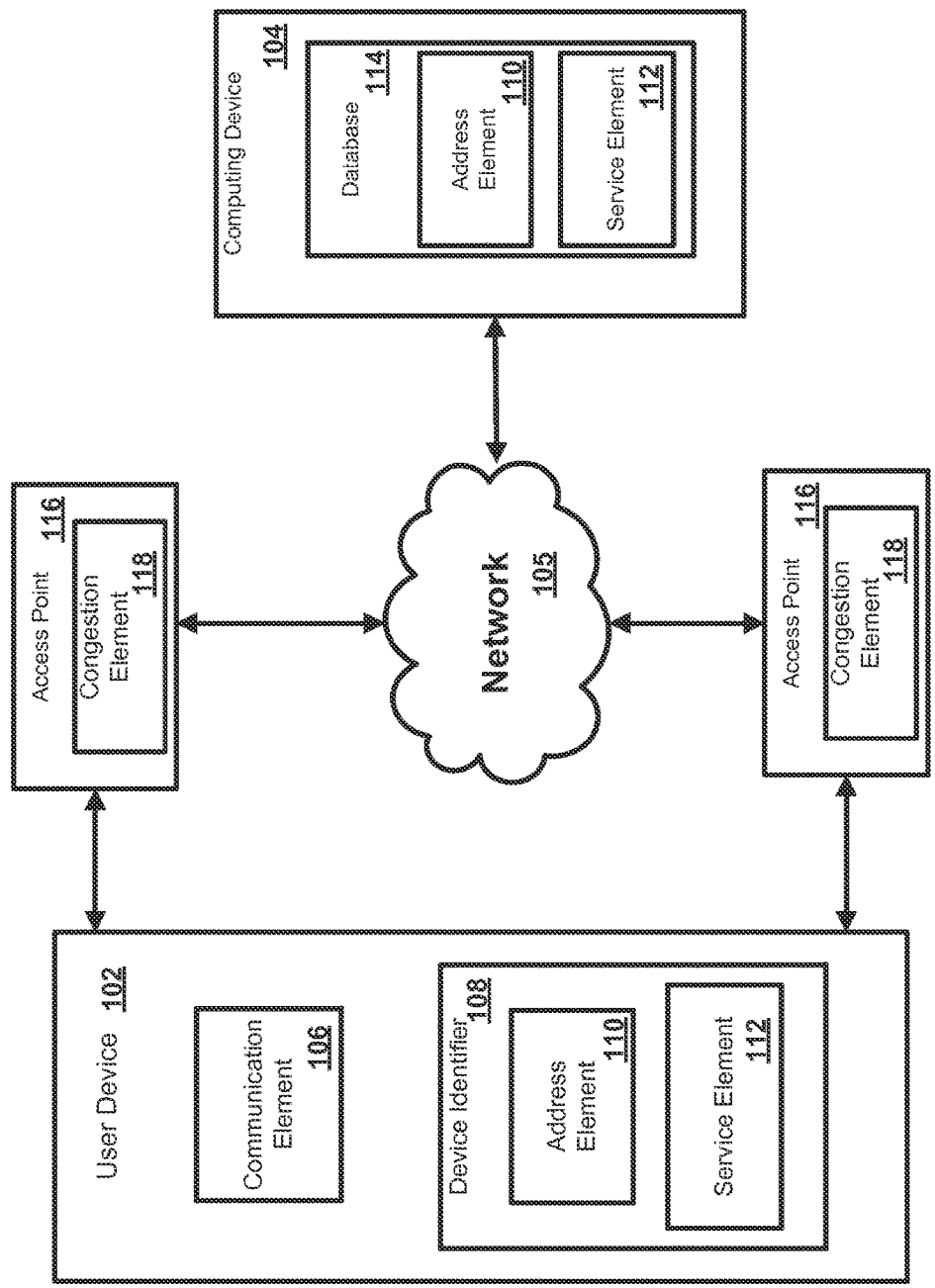

SYSTEMS AND METHODS FOR MANAGING A NETWORK

CROSS REFERENCE TO RELATED PATENT APPLICATION

This application is a continuation of U.S. patent application Ser. No. 13/669,742 filed Nov. 6, 2012, herein incorporated by reference in its entirety.

BACKGROUND

Networks can experience problems due to network constraints such as congestion. Certain network systems can monitor network conditions, but such systems suffer from deficiencies. Deficiencies can include failing to provide end-to-end and/or domain congestion indication in a granular fashion such as per port, per connection, or per class of service. This disclosure addresses such and other shortcomings related to network management.

SUMMARY

It is to be understood that both the following general description and the following detailed description are exemplary and explanatory only and are not restrictive, as claimed. Methods and systems for managing a network are disclosed. The methods and systems described herein, in one aspect, can manage congestion in a network.

In an aspect, discard eligibility (DE) bits in a service tag (S-Tag) of one or more data packets can be used to indicate congestion end-to-end or on a domain basis in packet networks. Data packets can comprise Ethernet frames. For example, when a downstream node is congested, the downstream node can define a congestion indicator (e.g., a DE bit) in one or more frames. The one or more frames comprising the congestion indicator can be transmitted to one or more upstream nodes to indicate congestion. As a further example, the congestion indicator can be a bit value such as the DE bit set to a value of "1." In an aspect, the congestion indicator can be used to indicate congestion information per port, per connection, or per class of service, or a combination thereof.

In an aspect, methods can comprise receiving a frame with a service tag at a first node. The service tag can represent congestion information of at least a portion of the network. If the first node is a boundary node, a downstream data rate can be modified based upon the congestion information. If the first node is not a boundary node, the congestion information can be transmitted to a second node. A boundary node can be a node that initiates or terminates congestion control. For example, boundary nodes can support Ethernet virtual connection termination points, such as, customer premises equipment. As a further example, for a domain defined by edge routers, boundary nodes can comprise the provider edge (PE) routers.

In another aspect, the methods can comprise determining congestion information of at least a portion of a network. User frames with a service tag can be transmitted to an upstream device of the network to indicate congestion.

In a further aspect, the methods can comprise receiving and addressing an indication of network congestion. The indication can relate to, for example, a service flow. A service flow can comprise an end-to-end traffic flow (e.g., from customer premises equipment (CPE) to other CPE or network devices) defined by traffic parameters such as average output rate, maximum output burst, and the like. As an example, a service flow can comprise an Ethernet virtual connection between user network interfaces (UNI) of a network. As a further example, a service flow can comprise a group of packets/frames flowing in an Ethernet virtual connection between UNIs and belong to an application with a defined class of service. An aggregate service flow can comprise one or more service flows.

As such, an effective bandwidth can be determined for the service flow. Further, a downstream data rate associated with the service flow can be modified based upon the effective bandwidth determined.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 1A is a block diagram of an exemplary system and network;

DETAILED DESCRIPTION

Figure 1B:
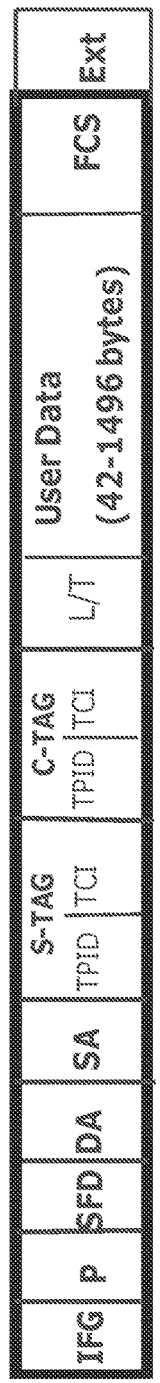
FIG. 1B is a block diagram of an exemplary data packet that can be transported by the network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1A illustrates various aspects of an exemplary network in which the present methods and systems can operate. The present disclosure is relevant to systems and methods for managing a network, for example. Those skilled in the art will appreciate that present methods may be used in various types of networks and systems that employ both digital and analog equipment. The system is described as comprised of elements. An element can be software, hardware, or a combination of software and hardware. One skilled in the art will appreciate that provided herein is a functional description and that the respective functions can be performed by software, hardware, or a combination of software and hardware.

The system and network can comprise a user device 102 in communication with a computing device 104 such as a server or Network Interface Device (NID), for example. The computing device 104 can be disposed locally, or remotely, relative to the user device 102. As an example, the user device 102 and the computing device 104 can be in communication via a private and/or public network 105 such as the Internet. Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting information to the user and receiving user feedback such as a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can be an internet protocol address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102.

In an aspect, the service element 112 can comprise an identification of a service provider associated with the user device 102 and/or with the class of user device 102. As an example, the service element 112 can comprise information relating to, or provided by, a communication service provider that is providing or enabling communication services to the user device 102. Services can be data services such as internet access, financial data transfers, or various file transfer, voice, and/or video services, or a combination thereof. As a further example, the service element 112 can comprise information relating to a preferred service provider for one or more particular services relating to the user device 102. In an aspect, the address element 110 can be used to identify or retrieve the service element 112, or vise versa. As a further example, one or more of the address element 110 and the service element 112 can be stored remotely from the user device 102 and retrieved by one or more devices such as the user device 102 and the computing device 104. Other information can be represented by the service element 112.

In an aspect, the computing device 104 can be a server for communicating with the user device 102. As an example, the computing device 104 can communicate with the user device 102 for providing services. In an aspect, the computing device 104 can allow the user device 102 to interact with remote resources such as data, devices, and files. As an example, the computing device can be configured as central location, a headend, or processing facility, which can receive content (e.g., data, input programming) from multiple sources. The computing device 104 can combine the content from the various sources and can distribute the content to user locations via a distribution system.

In an aspect, the computing device 104 can manage the communication between the user device 102 and a database 114 for sending and receiving data therebetween. As an example, the database 114 can store a plurality of files, webpages, user identifiers or records, or other information. As a further example, the user device 102 can request and/or retrieve a file from the database 114. In an aspect, the database 114 can store information relating to the user device 102 such as the address element 110 and/or the service element 112. As an example, the computing device 104 can obtain the device identifier 108 from the user device 102 and retrieve information from the database 114 such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing system 104 or some other device or system.

In an aspect, one or more access points 116 can be in communication with network 105. As an example, one or more of the access points 116 can facilitate the connection of a device, such as user device 102, to the network 105. As a further example, one or more of the access points 116 can be configured as a virtual local area network (VLAN) access point. In an aspect, one or more access points 116 can be configured as part of a Carrier Ethernet Network.

In an aspect, one or more of the access points 116 can comprise a congestion element 118. As an example, the congestion element 118 can be configured to receive/transmit data in packets or Ethernet frames. As a further example, the congestion element 118 can be configured to analyze the frames to determine downstream congestion information or transmit frames comprising a congestion indicator. In an aspect, the congestion element 118 can comprise a traffic conditioning element or function facilitates configured to analyze and condition data packets.

In an aspect, DE bits in a service-Tag (S-Tag) of Ethernet frames can be used to indicate congestion end-to-end or on a domain basis. For example, when a downstream node is congested, the node can set define a congestion indicator in one or more frames. The one or more frames comprising the congestion indicator can be transmitted to one or more upstream nodes to indicate congestion. As a further example, the congestion indicator can be a bit value such as a DE bit set to a value of "1," (e.g., DE=1).

In an aspect, when an upstream node receives the one or more frames with DE=1, the upstream node can transmit the received one or more frames with DE=1 to other upstream nodes without changing the DE bit value. If the upstream node that receives the one or more frames with DE=1 is a boundary node, the boundary node can reduce a data rate for downstream transmission and set DE bit to zero in reverse direction. In an aspect, the congestion indicator (e.g., DE bit) can be used to indicate congestion for port, connection, and/or class of service.

FIG. 1B illustrates an exemplary packet or frame structure that can be implemented as part of the systems and methods of the present disclosure. In an aspect, the frame structure can be the same or similar to the standard frame structure defined by IEEE 802.3-2005, incorporated herein by reference in its entirety. As an example, the frame structure can comprise an Interframe Gap, P/SFD (Preamble/Start of Frame Delimiter), TCI (Tag Control Information=VID+CFI/DE+PCP), S-Tag TPID: Service Tag Identifier, C-Tag TPID: Customer Tag Identifier, L/T (Length/Type): Length of frame or data type, user data, FCS (Frame Check Sequence), or Ext: Extension field, or a combination thereof.

Figure 1C:
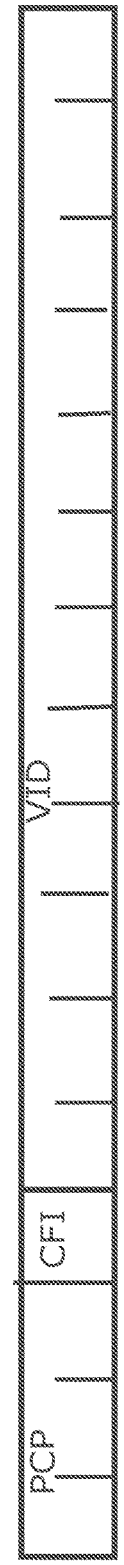
FIG. 1C is a block diagram of an exemplary customer tag.

FIG. 1C illustrates an exemplary customer tag (C-Tag) TCI format that can be implemented as part of the systems and methods of the present disclosure. In an aspect, the customer tag format can be the same or similar to the standard frame structure defined by IEEE 802.3-2005. As an example, the customer tag format can comprise priority code point (PCP), canonical format indicator (CFI), or VLAN identifier, or a combination thereof. Other data points can be used.

Figure 1D:
FIG. 1D is a block diagram of an exemplary service tag.

FIG. 1D illustrates an exemplary service tag (S-Tag) TCI format that can be implemented as part of the systems and methods of the present disclosure. In an aspect, the service tag format can be the same or similar to the standard frame structure defined by IEEE 802.3-2005. As an example, the service tag format can comprise priority code point (PCP), drop/discard eligibility indicator (DEI) such as discard elegibility bit (DE), or VLAN identifier, or tag protocol identifier (TPID), or a combination thereof. Other data points can be used.

In an aspect, DE bits in the service tag format in FIG. 1D can be used to identify frame colors at an External Network-Network Interface (ENNI), if Differentiated Services Code Point (DSCP) is not used to identify colors. As an example, colors can be used to identify the bandwidth profile conformance of a particular of a data packet, such as a service frame. As an example, green can indicate conformance with a committed rate of the bandwidth profile. As another example, yellow can indicate non-conformance with committed rate, but conformance with an excess rate of the bandwidth profile. As a further example, red can indicate non-conformance with a committed rate and an excess rate of the bandwidth profile.

In an aspect, priority code point (PCP) can be adequate to represent less than eight Class of Services (CoS) and two colors (e.g., Green and Yellow). Accordingly, the DE bits in a service tag format of frame structure can be used to indicate congestion end-to-end or on a domain basis. For example, when a downstream node is congested, the downstream node can define the DE bit of the frame structure to "1" and can transmit the frame structure to one or more upstream devices to indicate that the downstream node has determined a congested state.

Figure 2:
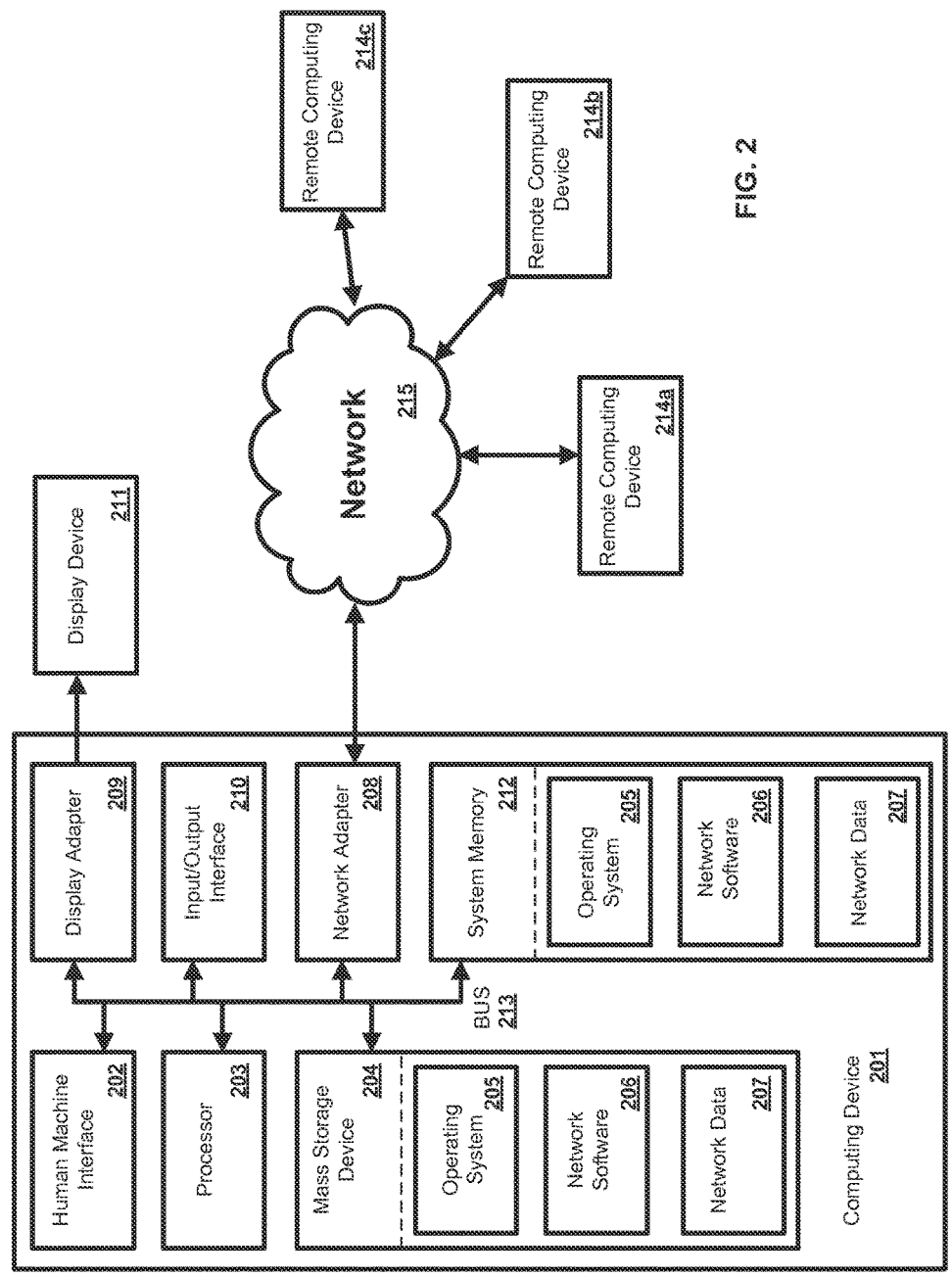
FIG. 2 is a block diagram of an exemplary computing device.

In an exemplary aspect, the methods and systems can be implemented on a computing system such as computing device 201 as illustrated in FIG. 2 and described below. By way of example, one or more of the user device 102 and the computing device 104 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. One skilled in the art will appreciate that this is a functional description and that the respective functions can be performed in a system by software, hardware, or a combination of software and hardware. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, network software 206, network data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as network data 207 and/or program modules such as operating system 205 and network software 206 that are immediately accessible to and/or are presently operated on by the processing unit 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and network software 206. Each of the operating system 205 and network software 206 (or some combination thereof) can comprise elements of the programming and the network software 206. Network data 207 can also be stored on the mass storage device 204. Network data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device, mouse, microphone, joystick, scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, a portable computer, a smart phone, a server, a router, a network computer, a peer device or other common network node, and so on. Logical connections between the computing device 201 and a remote computing device 214a,b,c can be made via a network 215, such as a local area network (LAN) and a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

Figure 3:
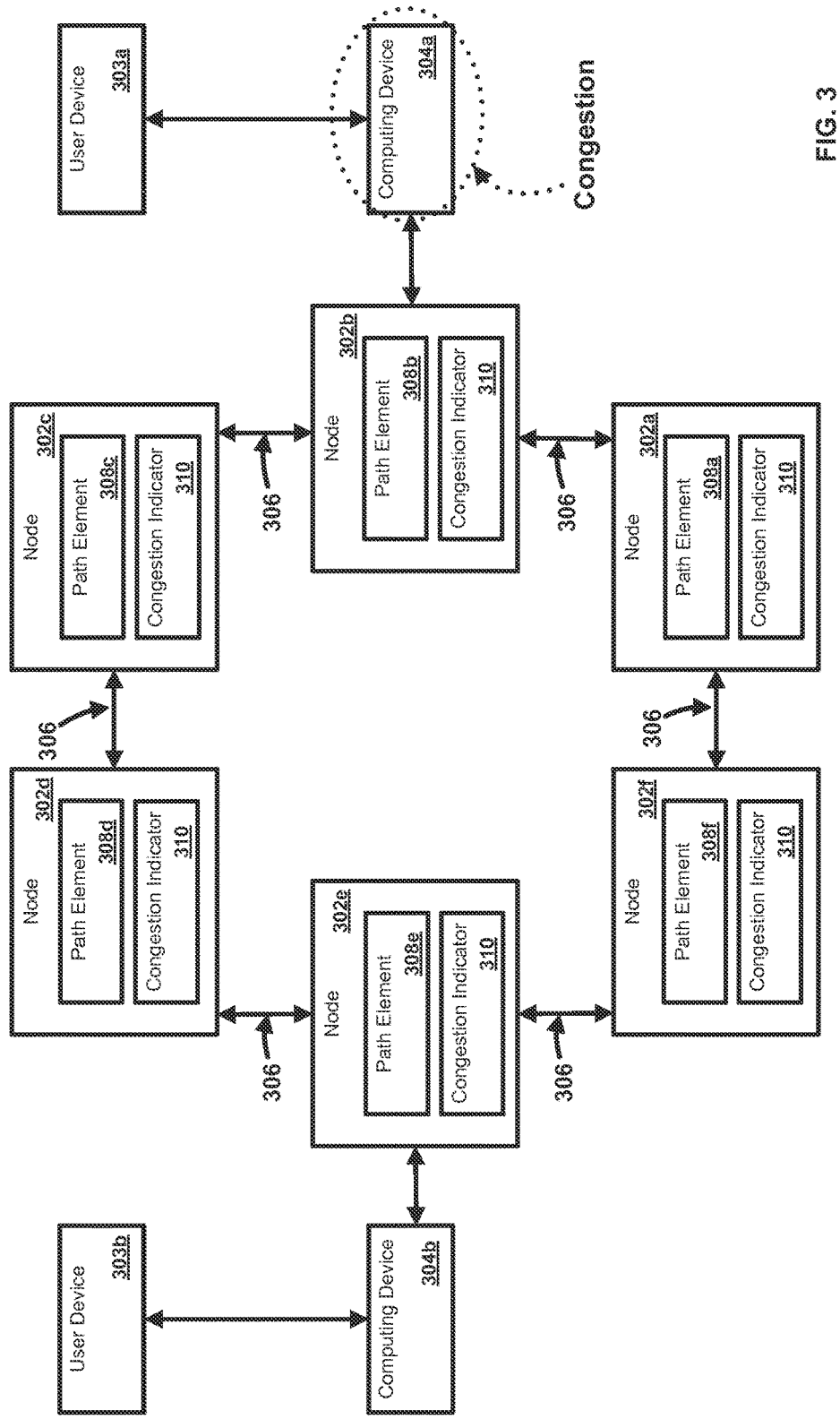
FIG. 3 is a diagram of an exemplary system and network.
Figure 4:
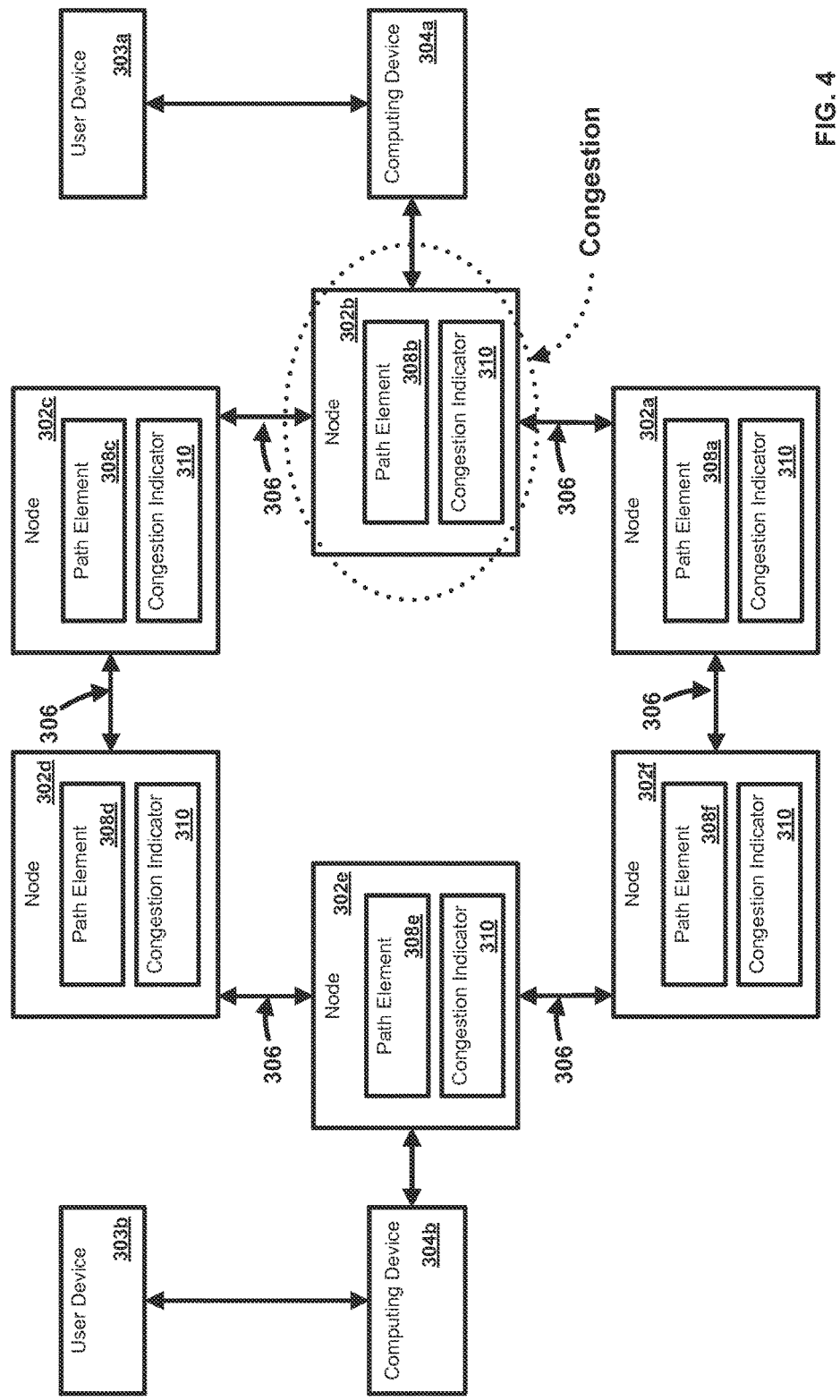
FIG. 4 is a diagram of an exemplary system and network.

FIGS. 3-4 illustrate an exemplary system and network. In an aspect, plurality of nodes 302a, 302b, 302c, 302d, 302e, 302f can be in communication with one or more user devices 303a, 303b and/or one or more computing devices 304a, 304b. One or more of the nodes 302a, 302b, 302c, 302d, 302e, 302f can be a network access point, router, switch, or other communication device. As an example, one or more user devices 303 can be an electronic device such as a computer, a smartphone, a laptop, a tablet, a set top box, a display device, or other device capable of communicating with one or more of the nodes 302a, 302b, 302c, 302d, 302e, 302f of the network. As a further example, one or more computing devices 304a, 304b can be a server, a gateway, customer premises equipment (CPE), network interface device (NID), optical networking unit (ONU), headend, terminal server, cable modem terminal system, or other network device. As an example, one or more of the nodes 302a, 302b, 302c, 302d, 302e, 302f can be configured to communicate with another of the nodes 302a, 302b, 302c, 302d, 302e, 302f and/or one or more of the computing devices 304a, 304b via one or more communication paths 306. In an aspect, the one or more communication paths 306 can comprise one or more uninterrupted communication links, sequential links, pre-defined paths or links, and/or intervening nodes Links can comprise a single point-to-point connection between two devices or access points. Paths can comprise one or more links. As an example, one or more of the communication paths 306 can comprise one or more of the nodes 302a, 302b, 302c, 302d, 302e, 302f. As a further example, one or more of the nodes 302a, 302b, 302c, 302d, 302e, 302f can be configured as a mesh network. In an aspect, one or more of the communication paths 306 can be configured to transmit one or more services.

In an aspect, one or more path elements 308a, 308b, 308c, 308d, 308e, 308f can comprise information relating to one or more of the communication paths 306. One or more path elements 308a, 308b, 308c, 308d, 308e, 308f can comprise information relating to congestion, path priority, path cost, capacity, bandwidth, signal strength, latency, error rate, path usage, and the like. As an example, the path element 308a, 308b, 308c, 308d, 308e, 308f can be or comprise the congestion element 118 (FIG. 1A). As a further example, the path element 308a, 308b, 308c, 308d, 308e, 308f can be configured to determine and/or generate a congestion indicator 310 such as a value of the DE bit in a received network frame.

As illustrated in FIG. 3, congestion can occur downstream a boundary node such as node 302b. As an example, FIG. 3 illustrates congestion occurring at computing device 304a. In an aspect, congestion information can be determined on a per port basis for a given device (e.g., node). For example, a port of a boundary node can receive a frame with congestion information (e.g., DE=1 due to downstream congestion). Although the port of the boundary node is not congested, a reduction in data rate transmission from the end node port may be required to address network congestion. As an example, the port receiving the congestion information can be set to a congested state in order to trigger a congestion control algorithm. As a further example, the PAUSE flow control defined by IEEE 802.3, hereby incorporated herein by reference, standards can be used as a congestion control algorithm. In an aspect, congestion information can be determined based on various entities such as on a connection (e.g., Ethernet connection, Ethernet virtual connection, etc.) basis and/or class of service (CoS) flow basis.

As illustrated in FIG. 4, congestion can occur at a boundary node such as boundary node 302b. In an aspect, congestion at node 302b can occur when a buffer associated with the node 302b exceed a threshold. As an example, a buffer associated with a port (e.g., access port or network port) of the node 302b can exceed a pre-set threshold ($T_B$). Accordingly, the port itself is congested, and the node 302b can activate a congestion control algorithm to reduce a data rate in both directions for all connections transported on that port. As a further example, the node 302b can then transmit frames having DE=0.

In an aspect, a buffer associated with a connection (e.g., Ethernet connection, virtual connection, etc.) of the node 302b can exceed a pre-set threshold ($t_B$). Accordingly, the connection itself is congested, and the node 302b can activate a congestion control algorithm to reduce a data rate in both directions for the connection transported on that port. As a further example, the node 302b can then transmit frames having DE=0.

In an aspect, a buffer associated with a class of service of the node 302b can exceed a pre-set threshold ($t_{CB}$). Accordingly, the class of service itself is congested, and the node 302b can activate a congestion control algorithm to reduce a data rate in one or both directions for that specific CoS flow transported on that port. As a further example, the node 302b can then transmit frames having DE=0.

In an aspect, when congestion indication is received at a node, the transmission data rate can be modified in response to the congestion information. As an example, the transmission data rate can be configured based upon one or more of the following formulas:

$$BWEF^{ASF} = \sum_{n=1}^{N} BWEF_n^{SF}; \text{ if it is port level congestion,} \quad (EQ\ 1)$$

where $BWEF^{SF}_n$ represents the effective bandwidth of a service flow and $BWEF^{ASF}$ represents effective bandwidth for the aggregated service flow of one or more service flows.

In an aspect, if congestion persists after the data rate is configured by EQ1 or the current rate is already at the effective bandwidth, then the congested node can reduce its transmission data rate to $$CIR^{ASF} = \sum_{n=1}^{N} CIR_n^{SF}; \text{ if it is port level congestion,} \quad (EQ\ 2)$$

where $CIR^{SF}_n$ represents the committed information rate of a service flow, and $CIR^{ASF}$ represents the committed information rate for the aggregate service flow of one or more service flows.

As an example, one or more nodes can discard (e.g., delete, do not transmit, etc.) yellow frames first and then green frames to reduce frames in the buffer below threshold $T_B$ for port, or $t_B$ for connection or $t_{CB}$ for CoS flow. As a further example, thresholds ($T_B$, $t_B$, $t_{CB}$) can be defined such that a buffer size that is determined to be below the defined thresholds can trigger a reduction in transmission data rates to an effective bandwidth rate or to a committed information rate.

In an aspect, transmitted and received frame counts can be monitored and correction can be made to ensure the updated transmission data rates. As an example, in order to allow statistical multiplexing with agreed packet loss ratio or frame loss ratio (FLR), effective bandwidth can be used in allocating bandwidth. As a further example, effective bandwidth can be calculated for each service flow (SF) and a sum of the effective bandwidths can be assigned to aggregate service flow (ASF).

In an aspect, a service flow can comprise an end-to-end traffic flow defined by traffic parameters such as average output rate, maximum output burst, and the like. As an example, a service flow can comprise an Ethernet virtual connection between user network interfaces (UNI) of a network. As a further example, a service flow can comprise a group of packets/frames flowing in an Ethernet virtual connection between UNIs and belong to an application with a defined class of service. An aggregate service flow can comprise one or more service flows.

In an aspect, effective bandwidth can be calculated based on one or more of the following formulas:

$$BWEF^{ASF} = \sum_{n=1}^{N} BWEF_n^{SF}; \quad (EQ\ 3)$$

instead of $$\text{Total Bandwidth} = CIR^{ASF} + EIR^{ASF}, \quad (EQ\ 4)$$

where $$CIR^{ASF} = \sum_{n=1}^{N} CIR_n^{SF}; \quad (EQ\ 5)$$

$$EIR^{ASF} = \sum_{n=1}^{N} EIR_n^{SF}; \quad (EQ\ 6),$$

where CIR can be defined as average output rate of the shaper or a policer for green frames, CBS can be defined as maximum output burst of the shaper or a policer for green frames, EIR can be defined as average output rate of the shaper or policer for yellow frames, and EBS can be defined as maximum output burst of the shaper or policer for yellow frames.

In an aspect, Effective Bandwidth for a given SF can be calculated as $$BWEF^{SF} = \max(CIR, PR/(1+(\max(jitter_{A-Z}, jitter_{Z-A})*PR)/MBS),$$

where PR=CIR+EIR (EQ7).

Equation EQ7 can be valid for service flows (or EVCs or CoS) with no loss SLAs (service level agreements). In an aspect, Effective Bandwidth for a given service flow (or EVCs or CoS) with loss SLAs, can be calculated as:

$$BWEF^{SF}=\max(CIR,PR*\alpha) \quad (EQ8),$$

wherein $\alpha=(\beta-b)+\sqrt{(\beta-b)^2+4(CIR/PR)\beta*b}/2\beta$, wherein $\beta=(\ln 1/FLR)(MBS/CIR)(1-CIR/PR)PR$, and wherein $Jitter_{A-Z}$ is a delay variation between a pair of packets of a given connection or flow travelling from end point A of the connection or flow to the end point Z of the connection or flow. $Jitter_{Z-A}$ is the delay variation between a pair of packets of a given connection or flow travelling from the end point Z of the connection or flow to the end point A of the connection or flow. PR is the peak rate and can be defined by a port rate or EIR+CIR for a given connection or flow. FLR is the frame loss ratio and can be defined by ((the number of frames transmitted minus the number of frames received)/(number of frames transmitted)) in a given connection or flow. MBS is the maximum output burst of a shaper or policer associated with the PR.

Figure 5:
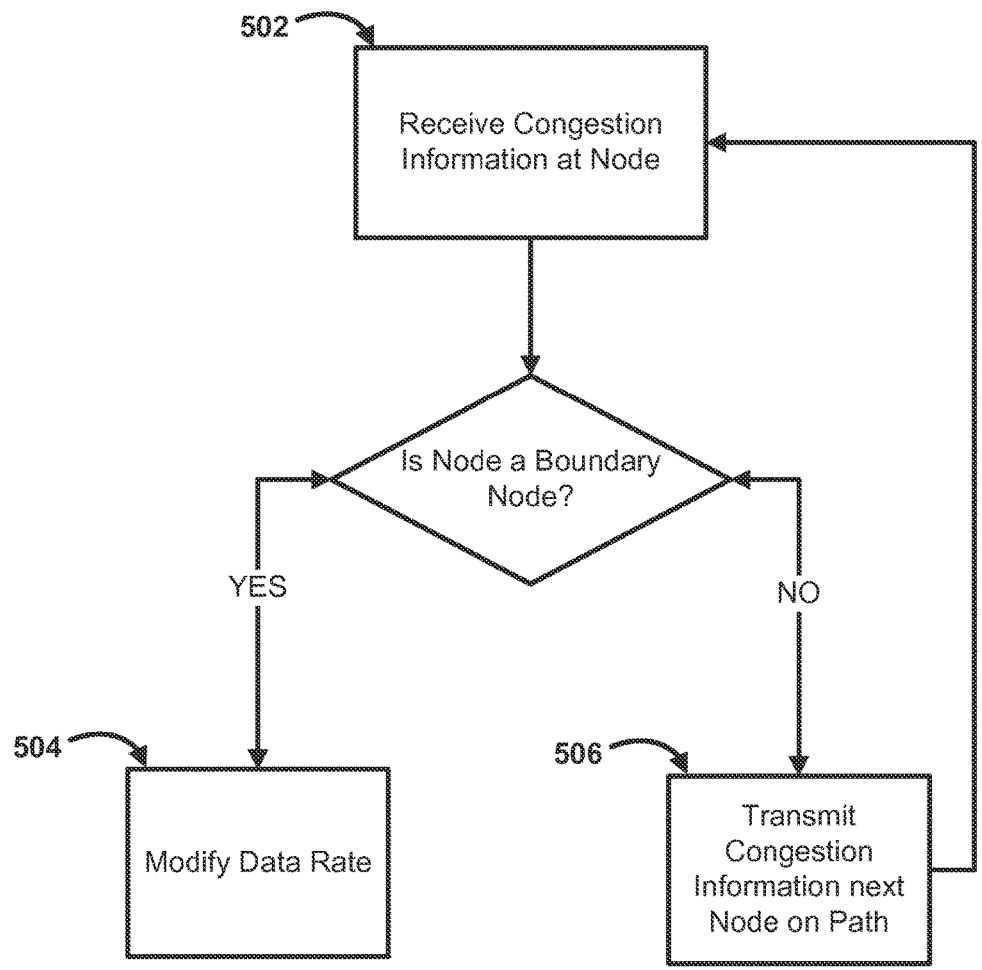
FIG. 5 is a flow chart of an exemplary method.

In an aspect, provided are methods for providing services to a user and/or user device. FIG. 5 illustrates an exemplary method for managing a network. In step 502, congestion information, e.g., a frame with a service tag can be received at a first node. In an aspect, the service tag can represent congestion information of at least a portion of the network. As an example, the service tag can comprise discard eligibility data representing the congestion information. In an aspect, the discard eligibility data can represent the congestion information. As an example, the discard eligibility bit having a value of "1" can indicate a congested state of at least a portion of the network. As a further example, the discard eligibility bit having a value of "0" can indicate a non-congested state of at a portion of the network. In an aspect, the congestion information can represent one or more of port level capacity, connection level capacity, and class of service level capacity.

In step 503, a determination can be made if a node (e.g., the first node) is a boundary node.

In step 504, if the first node is a boundary node, a downstream data rate can be modified based upon the congestion information. In an aspect, modifying a downstream data rate can comprise reducing a downstream data rate based upon a congestion control algorithm. As an example, modifying a downstream data rate can comprise configuring the transmission data rate of one or more nodes based upon the formulas set forth herein.

In step 506, if the first node is not a boundary node, the congestion information can be transmitted to a second node. As an example, the second node is upstream of the first node. In an aspect, the congestion information can be received at the second node. If the second node is a boundary node, a downstream data rate can be modified based upon the congestion information. If the second node is not a boundary node, transmitting the congestion information to a third node and the process can be repeated.

Figure 6:
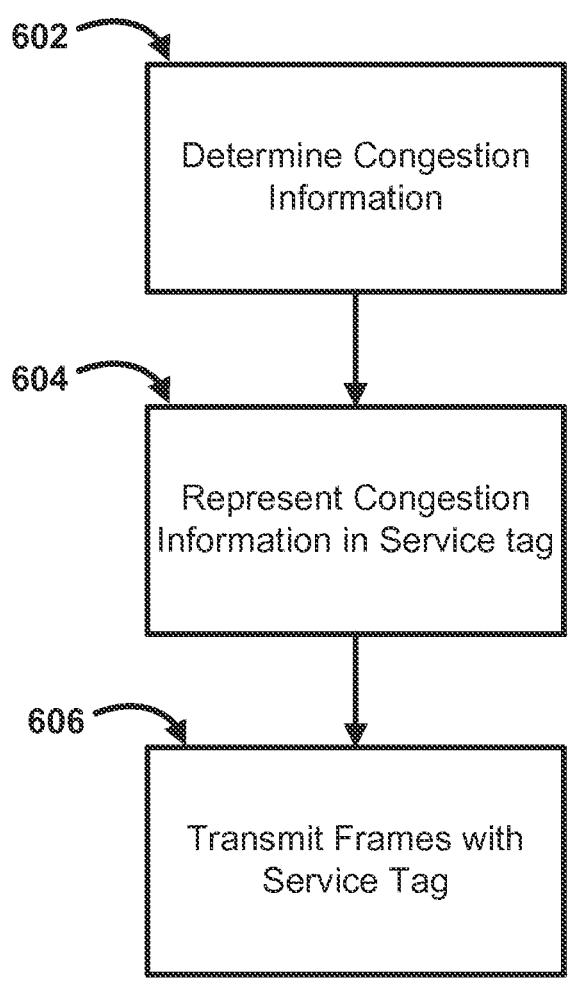
FIG. 6 is a flow chart of an exemplary method.

In an aspect, FIG. 6 illustrates an exemplary method for determining congestion information at a node. In step 602, congestion information can be determined for at least a portion of a network. In an aspect, determining congestion information can comprise receiving an upstream communication from a downstream device. As an example, determining congestion information can comprise comparing a network parameter to a threshold value. As a further example, the network parameter is buffer capacity, effective bandwidth, port level capacity, connection level capacity, or class of service level capacity, or a combination thereof.

In step 604, a service tag in one or more packets or frames can be set to represent the congestion information. In an aspect, the service tag can comprise discard eligibility data representing the congestion information. As an example, the discard eligibility data representing the congestion information can be a binary bit. As another example, the discard eligibility bit having a value of one can indicate a congested state of the at least a portion of the network. As a further example, the discard eligibility bit having a value of zero can indicate a non-congested state of the at least a portion of the network.

In step 606, the one or more frames with the service tag can be transmitted to an upstream device of the network. In an aspect, the upstream device can receive the frames with service tag. As an example, if the upstream device is a boundary node, a downstream data rate can be modified based upon the congestion information. As a further example, if the upstream device is not a boundary node, the congestion information can be transmitted to a second upstream device.

Figure 7:
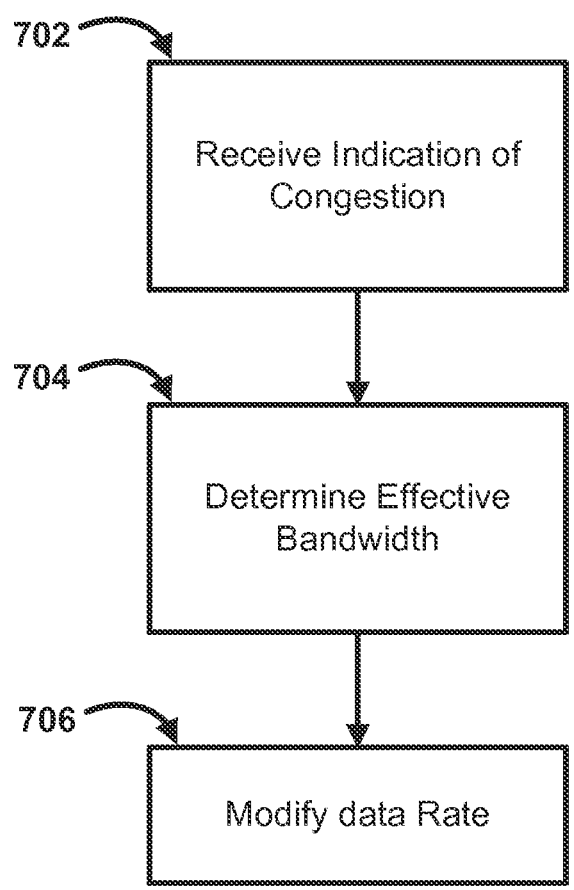
FIG. 7 is a flow chart of an exemplary method.

In an aspect, FIG. 7 illustrates an exemplary method for determining or modifying an effective bandwidth and/or data rate. In step 702, an indication of network congestion can be received. In an aspect, the indication of network congestion can relate to a service flow. As an example, a service tag can be provided as the indication of network congestion. In an aspect, the service tag can comprise discard eligibility data representing the congestion information. As an example, the discard eligibility data representing the congestion information can be a binary bit. As another example, the discard eligibility bit having a value of one can indicate a congested state of the at least a portion of the network. As a further example, the discard eligibility bit having a value of zero can indicate a non-congested state of the at least a portion of the network. In an aspect, the indication of network congestion can represent one or more of port level capacity, connection level capacity, and class of service level capacity.

In step 704, an effective bandwidth can be determined for the service flow. In an aspect, the effective bandwidth can be determined based upon the formulas disclosed herein.

In step 706, a data rate associated with the service flow can be modified based upon the effective bandwidth determined. In an aspect, modifying the data rate can comprise reducing a data rate based upon a congestion control algorithm. As an example, modifying the data rate can comprise configuring the transmission data rate of one or more nodes based upon the formulas set forth herein.

The systems and methods of the present disclosure can maximize network utilization by regulating traffic between source and destination automatically, thereby reducing substantial delays and frame drops.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving a message at a boundary node via a first messaging protocol, wherein the message is configured for a second messaging protocol, wherein the second messaging protocol requires that a bit of the message be reserved;
   determining that the reserved bit indicates congestion on a network for a class of service; and
   responsive to the reserved bit indicating congestion, modifying a downstream data rate for the class of service.

2. The method of claim 1, wherein the message comprises a service tag comprising the reserved bit.

3. The method of claim 1, wherein receiving the message comprises receiving the message via a port, and the method further comprises setting the port to a congested state.

4. The method of claim 3, wherein modifying the downstream data rate further comprises implementing a congestion control algorithm.

5. The method of claim 1, wherein receiving the message comprises receiving the message from a downstream node.

6. The method of claim 1, wherein the reserved bit comprises a discard eligibility bit.

7. The method of claim 1, wherein determining that the reserved bit indicates congestion on the network comprises determining that the reserved bit corresponds to a first state.

8. The method of claim 7, further comprising:
   receiving a second message at the boundary node, wherein the second message comprises a second reserved bit; and
   responsive to the second reserved bit being in a second state, determining that the second reserved bit of the second message indicates no congestion.

9. A method comprising:
   determining that congestion is occurring at a boundary node for a class of service;
   responsive to determining that congestion is occurring at the boundary node, modifying a data rate of the data associated with the class of service;
   responsive to determining that congestion is not occurring at the boundary node, generating a message configured for a second messaging protocol, wherein the second messaging protocol requires that a bit of the message be reserved, wherein the reserved bit indicates congestion for the class of service by corresponding to a state, and transmitting the message to an upstream node via a first messaging protocol.

10. The method of claim 9, wherein determining that congestion is occurring at the boundary node comprises determining that a buffer associated with the boundary node exceeds a predefined threshold.

11. The method of claim 9, wherein determining that congestion is occurring at the boundary node comprises determining that congestion is occurring at the boundary node relative to a port of the boundary node, and wherein modifying the data rate comprises modifying the data rate of data transported on the port.

12. The method of claim 9, wherein determining that congestion is occurring at the boundary node comprises determining that congestion is occurring at the boundary node relative to a network connection of the boundary node, and wherein modifying the data rate comprises modifying the data rate of data transported via the network connection.

13. The method of claim 9, wherein the message comprises a service tag comprising the reserved bit.

14. The method of claim 9, wherein the reserved bit comprises a discard eligibility bit.

15. A method comprising:
    receiving a message at a node via a first messaging protocol, wherein the message is configured for a second messaging protocol; wherein the second messaging protocol requires that a bit of the message be reserved;
    determining that the reserved bit indicates congestion relating to a service flow for a class of service on at least a portion of a network;
    determining an effective bandwidth for the at least the portion of the network; and
    modifying, based on the effective bandwidth, a data rate associated with the service flow for the class of service in the at least the portion of the network.

16. The method of claim 15, wherein the reserved bit comprises a discard eligibility bit.

17. The method of claim 15, wherein determining the effective bandwidth comprises determining the effective bandwidth relative to a port of the node.

18. The method of claim 15, wherein determining the effective bandwidth comprises determining the effective bandwidth relative to a network connection.

19. An apparatus comprising:
    one or more processors; and
    a memory storing processor executable instructions that, when executed by the one or more processors, cause the apparatus to:
      receive a message at a boundary node via a first messaging protocol, wherein the message is configured for a second messaging protocol, wherein the second messaging protocol requires that a bit of the message be reserved;
      determine that the reserved bit indicates congestion on a network for a class of service; and
      responsive to the reserved bit indicating congestion, modify a downstream data rate for the class of service.

20. The apparatus of claim 19, wherein the message comprises a service tag comprising the reserved bit.

21. The apparatus of claim 19, wherein the processor executable instructions that, when executed by the one or more processors, cause the apparatus to receive the message further comprise processor executable instructions that, when executed by the one or more processors, cause the apparatus to receive the message via a port, and further comprising processor-executable instructions that, when executed by the one or more processors, cause the apparatus to set the port to a congested state.

22. The apparatus of claim 21, wherein the processor executable instructions that, when executed by the one or more processors, cause the apparatus to modify the downstream data rate further comprise processor executable instructions that, when executed by the one or more processors, cause the apparatus to implement a congestion control algorithm.

23. The apparatus of claim 19, wherein the processor executable instructions that, when executed by the one or more processors, cause the apparatus to receive the message further comprise processor executable instructions that, when executed by the one or more processors, cause the apparatus to receive the message from a downstream node.

24. The apparatus of claim 19, wherein the reserved bit comprises a discard eligibility bit.

25. The apparatus of claim 19, wherein the processor executable instructions that, when executed by the one or more processors, cause the apparatus to determine that the reserved bit indicates congestion on the network further comprise processor executable instructions that, when executed by the one or more processors, cause the apparatus to determine that the reserved bit corresponds to a first state.

26. The apparatus of claim 25, wherein the processor executable instructions, when executed by the one or more processors, further cause the apparatus to:
  receive a second message at the boundary node, wherein the second message comprises a second reserved bit; and
  responsive to the second reserved bit being in a second state, determine that the second reserved bit of the second message indicates no congestion.

27. An apparatus comprising:
  one or more processors; and
  memory storing processor executable instructions that, when executed by the one or more processors, cause the apparatus to:
  determine if congestion is occurring at a boundary node for a class of service;
  responsive to determining that congestion is occurring at the boundary node, modify a data rate of the data associated with the class of service;
  responsive to determining that congestion is not occurring at the boundary node, generate a message configured for a second messaging protocol, wherein the second messaging protocol requires that a bit of the message be reserved, wherein the reserved bit indicates congestion for the class of service by corresponding to a state, and
  transmit the message to an upstream node via a first messaging protocol.

28. The apparatus of claim 27, wherein the processor executable instructions that, when executed by the one or more processors, cause the apparatus to determine that congestion is occurring at the boundary node further comprise processor executable instructions that, when executed by the one or more processors, cause the apparatus to determine that a buffer associated with the boundary node exceeds a predefined threshold.

29. The apparatus of claim 27, wherein the processor executable instructions that, when executed by the one or more processors, cause the apparatus to determine that congestion is occurring at the boundary node further comprise processor executable instructions that, when executed by the one or more processors, cause the apparatus to determine that congestion is occurring at the boundary node relative to a port of the boundary node, and wherein the processor executable instructions that, when executed by the one or more processors, cause the apparatus to modify the data rate further comprise processor executable instructions that, when executed by the one or more processors, cause the apparatus to modify the data rate of data transported on the port.

30. The apparatus of claim 27, wherein the processor executable instructions that, when executed by the one or more processors, cause the apparatus to determine that congestion is occurring at the boundary node further comprise processor executable instructions that, when executed by the one or more processors, cause the apparatus to determine that congestion is occurring at the boundary node relative to a network connection of the boundary node, and wherein the processor executable instructions that, when executed by the one or more processors, cause the apparatus to modify the data rate further comprise processor executable instructions that, when executed by the one or more processors, cause the apparatus to modify the data rate of data transported via the network connection.

31. The apparatus of claim 27, wherein the message comprises a service tag comprising the reserved bit.

32. The apparatus of claim 27, wherein the reserved bit comprises a discard eligibility bit.

33. An apparatus comprising:
  one or more processors; and
  memory storing processor executable instructions that, when executed by the one or more processors, cause the apparatus to:
  receive a message at a node via a first messaging protocol, wherein the message is configured for a second messaging protocol, wherein the second messaging protocol requires that a bit of the message be reserved;
  determine that the reserved bit indicates congestion relating to a service flow for a class of service on at least a portion of a network;
  determine an effective bandwidth for the at least the portion of the network; and
  modify, based on the effective bandwidth, a data rate associated with the service flow for the class of service in the at least the portion of the network.

34. The apparatus of claim 33, wherein the reserved bit comprises a discard eligibility bit.

35. The apparatus of claim 33, wherein the processor executable instructions that, when executed by the one or more processors, cause the apparatus to determine the effective bandwidth further comprise processor executable instructions that, when executed by the one or more processors, cause the apparatus to determine the effective bandwidth relative to a port of the node.

36. The apparatus of claim 33, wherein the processor executable instructions that, when executed by the one or more processors, cause the apparatus to determine the effective bandwidth further comprise processor executable instructions that, when executed by the one or more processors, cause the apparatus to determine the effective bandwidth relative to a network connection.

* * * * *